(12) United States Patent
Jang et al.

(10) Patent No.: US 7,756,819 B2
(45) Date of Patent: Jul. 13, 2010

(54) INTEGRATED AUTHORING SYSTEM FOR ELECTRONIC TECHNICAL MANUAL AND PAPER TECHNICAL MANUAL USING LOGISTICS SUPPORT ANALYSIS DATA AND AUTHORING METHOD THEREFOR

(75) Inventors: Myung-Jin Jang, Daejeon (KR); Byung-Jik Yoo, Daejeon (KR); Kwang-Taek Lee, Daejeon (KR); Hyun-Jun Ju, Cheongwon (KR)

(73) Assignee: Agency for Defense Development, Daejeon (KR)

( * ) Notice: Subject to any disclaimer, the term of this patent is extended or adjusted under 35 U.S.C. 154(b) by 1134 days.

(21) Appl. No.: 11/207,061

(22) Filed: Aug. 17, 2005

(65) Prior Publication Data

US 2006/0149770 A1     Jul. 6, 2006

(30) Foreign Application Priority Data

Jan. 3, 2005     (KR) .................... 10-2005-0000250

(51) Int. Cl.
*G06F 17/00* (2006.01)
*G06F 7/00* (2006.01)
(52) U.S. Cl. .................... 707/104.1; 707/204; 707/101
(58) Field of Classification Search ............... 707/104.1
See application file for complete search history.

(56) References Cited

U.S. PATENT DOCUMENTS

| 5,457,792 | A | * | 10/1995 | Virgil et al. ................ 707/3 |
| 5,493,679 | A | * | 2/1996 | Virgil et al. ............... 707/104.1 |
| 5,956,737 | A | * | 9/1999 | King et al. .................. 715/202 |
| 5,963,966 | A | * | 10/1999 | Mitchell et al. ............. 715/236 |
| 6,377,956 | B1 | * | 4/2002 | Hsu et al. ................. 707/104.1 |
| 7,386,436 | B2 | * | 6/2008 | Beck et al. ..................... 704/3 |
| 2005/0005239 | A1 | * | 1/2005 | Richards ..................... 715/530 |

* cited by examiner

*Primary Examiner*—Wilson Lee
*Assistant Examiner*—Binh V Ho
(74) *Attorney, Agent, or Firm*—Jeffrey J. King; Patent Networks Law Group PLLC

(57) ABSTRACT

Disclosed are an integrated authoring system for an electronic technical manual and a paper technical manual using logistics support analysis data, which is capable of authoring an interactive electronic technical manual (IETM) of Class IV level and a paper technical manual at the same time. The integrated authoring system for an electronic technical manual and a paper technical manual using logistics support analysis data comprises: an iCAST-LSA (intelligent computer based acquisition support tool-logistics support analysis) module; a TMM (Technical Manual Management) module for performing a technical manual management function by importing from the DB of the iCAST-LSA module or exporting to the DB of the iCAST-LSA module; an illustrated drawing manager module; and a TMA (Technical Manual Author) module for performing a manual author manager function for sending and receiving illustrated drawings (ID) or CGM data to and from the illustrated drawing manager module.

7 Claims, 12 Drawing Sheets

FIG. 4

IMPORT KEY

REFERENCE :
    EVERY LCN WHOSE LCN TYPE IN THE SAME EIAC(EIAC ENTERED UPON LOG-ON) IS "P"

DATA :
    ELAC, LCN, ALC, LCN TYPE, FGC, REFERENCE NUMBER, CAGE, KOREAN PRODUCT NAME,
    TRANSPORT UNIT, QUANTITY PER ASSEMBLY

<XB table>

|   | COLUMN   | TYPE     | LENGTH | PROPERTY |                                                                  | DED |
|---|----------|----------|--------|----------|------------------------------------------------------------------|-----|
| 1 | EIACODXA | VARHCAR2 | 10     | NN       | END ITEM ACRONYM CODE                                            | 98  |
| 2 | LSACONXB | VARHCAR2 | 18     | NN       | LSA CONTROL NUMBER (LCN)                                         | 199 |
| 3 | ALTLCNXB | NUMBER   | 2, 0   | NN       | ALTERNATE LCN CODE                                               | 19  |
| 4 | LCNTYPXB | VARHCAR2 | 1      | NN       | LCN TYPE                                                         | 203 |
| 5 | LCNINDXB | VARHCAR2 | 38     |          | LCN INDENTURE CODE                                               | 200 |
| 6 | TMFGCDXB | VARHCAR2 | 1      |          | TECHNICAL MANUAL FUNCTIONAL (MAINTENANCE ALLOCATION CHART)       | 438 |

FIG. 5A

<MANUAL REGISTRATION SCREEN STRUCTURE : AW-1>

| MANUAL CODE (TMI) | MANUAL NUMBER (TM_NO) | MAINTENANCE LEVEL(TM_LEV) | MANUAL GROUP | MANUAL TITLE | TMI RELATED ITEM | | END ITEM UOC | S/N UOC | FUNCTION |
|---|---|---|---|---|---|---|---|---|---|
| | | | | | LCN | ALC | | | |
| AS1 | 2311-20P | O(ORGANIZATION) | IPB(ILLUSTRATED PARES BREAKDOWN) | CAR BODY REPAIR PARTS | TA | 00 | | | MODIFY DELETE |
| AS2 | 2311-34 | F(FIELD) H(GENERAL SUPPORT) | MAINTENANCE MANUAL | MAINTENANCE MANUAL TO BE INCLUDED | TB | 00 | | | MODIFY DELETE |
| AS3 | 2311-50 | D(DEPOT) | DEPOT MAINTENANCE TASK REQUIREMENT | FUEL PUMP | T1AAAA | 00 | | | MODIFY DELETE |

INSERT (AUTO REGISTRATION OF TEST EQUIPMENT OPERATION GUIDE)

FIG. 5B

AUTO REGISTRATION OF TEST EQUIPMENT OPERATION GUIDE

| EIAC | UOC | LCN (FROM) | LCN (TO) | ALC | TMI | MAINTENANCE LEVEL | REMARK |
|---|---|---|---|---|---|---|---|
| HYUN | AAA | T | TZ | 00 | AT | CREW LEVEL, ORGANIZATION, DIRECT SUPPORT LEVEL(OR FIELD LEVEL) GENERAL SUPPORT LEVEL, DEPOT LEVEL | CHECK |

FIG. 7

INTEGRATED AUTHORING SYSTEM FOR ELECTRONIC TECHNICAL MANUAL AND PAPER TECHNICAL MANUAL USING LOGISTICS SUPPORT ANALYSIS DATA AND AUTHORING METHOD THEREFOR

BACKGROUND OF THE INVENTION

1. Field of the Invention

The present invention relates to a manual authoring technique which is capable of authoring a paper technical manual and an electronic technical manual of Class IV level at the same time by using supply data and maintenance data based on MIL-STD-1388-2B, the international standard for a logistics support analysis database (LSA DB), and illustrated drawing information of an illustrated drawing manager module, and more particularly, to an integrated authoring system for an electronic technical manual and a paper technical manual using logistics support analysis data, which is capable of authoring an interactive electronic technical manual (IETM) of Class IV level and a paper technical manual at the same time by automatically converting data extracted from an international standard MIL-STD-1388-2B based logistics support analysis (LSA) database to an international standard MIL-PRF-87269 or MIL-STD-2361 based database, and an integrated authoring method therefore.

2. Description of the Background Art

Generally, paper technical manuals are largely classified into a supply manual, maintenance manual, user manual, and tools and test equipment manuals, and contain a large quantity of information. In case of an electronic technical manual, it is comprised of a variety of media, including illustrated drawings, tables, texts, voice, moving images, etc.

The MIL-STD-1388-2B standard logistics support analysis database program in the prior art provided data to be applied to a technical manual in a file format for a text editor of texts, HTML, SML, etc.

As above, since the MIL-STD-1388-2B standard logistics support analysis database program according to the prior art provided data to be applied to a technical manual in a file format for a text editor of texts, HTML, SML, etc., there were problems that it was only applicable to the authoring of an electronic technical manual lower than Class III for storing or/managing technical manual contents in an electronic file format, but not applicable to electronic technical manuals higher than Class IV for storing and/or managing and viewing technical manual contents in a database format.

There was a drawback that since text editor files for technical manual data provided by another logistics support analysis database according to the prior art cannot satisfy document standards (e.g., page layout, font type and size, etc.) required for electronic technical manuals lower than Class III or general paper technical manuals, the manual developer had to re-edit them. Moreover, it was problematic in that information including tables, illustrated drawings, etc., which occupies a considerable part of manual contents, could not be provided.

SUMMARY OF THE INVENTION

Therefore, an object of the present invention is to provide to an integrated authoring system for an electronic technical manual and a paper technical manual using logistics support analysis data, which is capable of authoring an interactive electronic technical manual (IETM) of Class IV level and a paper technical manual at the same time by automatically converting data extracted from an international standard logistics support analysis (LSA) database to an international standard MIL-PRF-87269 or MIL-STD-2361 based database, and an integrated authoring method therefor.

To achieve the above object, there is provided an integrated authoring system for an electronic technical manual and a paper technical manual using logistics support analysis data according to the present invention, comprising: an iCAST-LSA (intelligent computer based acquisition support tool-logistics support analysis) module 11; a TMM (technical manual management) module 12 for performing a technical manual management function by importing from the DB of the iCAST-LSA module 11 or exporting to the DB of the iCAST-LSA module 11; an illustrated drawing manager module 13; and a TMA (technical manual author) module 14 for performing a manual author manager function for sending and receiving illustrated drawings (ID) or CGM data to and from the illustrated drawing manager module 13.

To achieve the above object, there is provided an integrated authoring method for an electronic technical manual and a paper technical manual using logistics support analysis data according to the present invention, comprising: the manual author modeling step of constructing a manual contents database by extracting information to be included in the authoring of a technical manual from a logistics support analysis database of international standards, defining basic conditions for automatically extracting data to be included in the technical manual from the manual contents database by defining items, maintenance level, etc. associated with the classification of the technical manual while creating the technical manual, and then automatically creating a table of contents; the manual data conversion step of automatically extracting information to be included in the corresponding table of contents of the technical manual from the manual contents database on the basis of a search condition entered upon creating the technical manual and storing the extracted information in an international standard (MIL-PRF-87269) interactive electronic technical database higher than Class IV; the manual author-illustrated drawing manager module linkage processing step of automatically performing a user's request for illustrated drawings and an insertion task through a computer system in a network environment and identifying and managing each illustrated drawing without redundancy through identification codes generated from the chapter-section-paragraph information of the manual into which drawings are to be inserted; and the database conversion step of converting the MIL-PRF-87269 standard IETM database into a MIL-STD-2361 standard IETM database according to a user request in consideration of the fact that IETM DB-related international standards are not unified.

Other objects and characteristics of the present invention are apparent from the detailed descriptions explained in conjunction with the related drawings.

BRIEF DESCRIPTION OF THE DRAWINGS

FIG. 4 is an exemplary view showing a basic design table for manual contents data extraction according to the present invention;

FIGS. 5a and 5b are explanatory views showing the concepts of manual creation and automatic registration of a test equipment operation guide according to the present invention;

FIG. 7 is an exemplary view showing a database which is a storage result of the international standard MIL-PRF-87269 based data according to the present invention;

DETAILED DESCRIPTION OF THE PREFERRED EMBODIMENTS

Hereinafter, a preferred embodiment of an integrated authoring system for an electronic technical manual and a paper technical manual using logistics support analysis data, which is capable of authoring an interactive electronic technical manual (IETM) of Class IV level and a paper technical manual at the same time by automatically converting data extracted from an international standard logistics support analysis (LSA) database to an international standard MIL-PRF-87269 or MIL-STD-2361 based database, the international standard, and an integrated authoring method therefore will be described in detail with reference to FIGS. 1 to 11.

Figure 1:
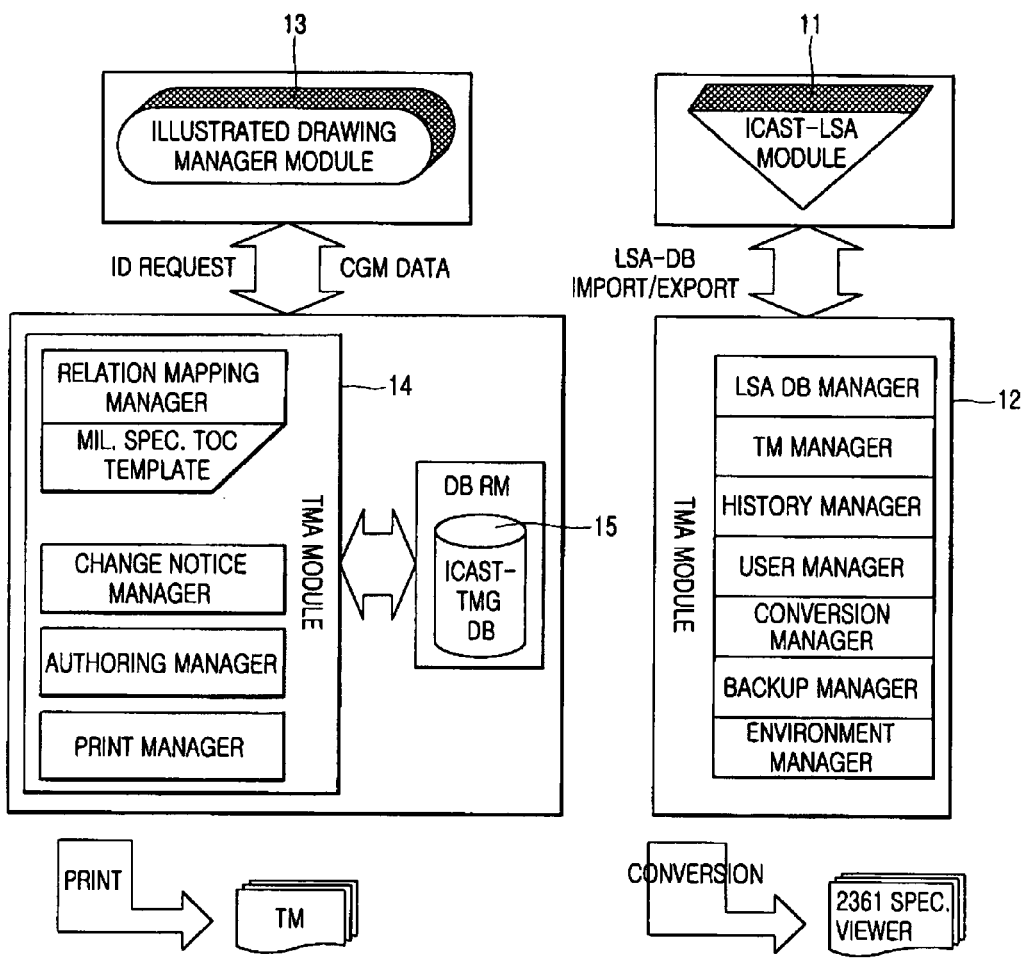
FIG. 1 is a conceptual view showing the construction and operation of an integrated authoring system for an electronic technical manual and a paper technical manual according to the present invention.

FIG. 1 is a conceptual view showing the construction and operation of an integrated authoring system for an electronic technical manual and a paper technical manual according to the present invention.

As shown in FIG. 1, the integrated authoring system for an electronic technical manual and a paper technical manual using logistics support analysis data according to the present invention comprises: an iCAST-LSA (intelligent computer based acquisition support tool-logistics support analysis) module 11; a TMM (technical manual management) module 12 for performing a technical manual management function by importing from the DB of the iCAST-LSA module 11 or exporting to the DB of the iCAST-LSA module 11; an illustrated drawing manager module 13; and a TMA (technical manual author) module 14 for performing a manual author manager function for sending and receiving illustrated drawings (ID) or CGM data to and from the illustrated drawing manager module 13. Here, 'Import' means the procedure of constructing a manual contents database by extracting all data to be included in an electronic or paper technical manual from a LSA DB. In contrast, 'Export' means the procedure of extracting information to be input into the LSA DB from the manual contents DB (international standard MIL-PRF-87269) having data to be included in an electronic technical manual and sending the information to the DB of the iCAST-LSA module.

The TMM module 12 comprises: a logistics support analysis database manager (LSADB manager) for extracting LSA information from an interactive electronic technical manual DB of MIL-PRF-87269 standard and performing the Export thereof to the iCAST-LSA DB, contrary to the Import for constructing a manual contents DB by extracting technical manual information from the DB of the iCAST-LSA module 11 (i.e., the logistics support analysis database (LSA DB)); a technical manual manager (TM manager) for creating all kinds of manuals required to operate each weapon system for each weapon system; a history manager for managing a version of the technical manual; a user manager for registering a user and granting rights to the user; a conversion manager for automatically converting an international standard MIL-PRF-87269 based DB into a MIL-STD-2361 based DB; a backup manager for preventing data loss; and an environment manager for adjusting the user environment of the integrated authoring system for an electronic technical manual and a paper technical manual according to the present invention for each user.

The TMA module 14 comprises: a relation mapping manager for requesting the illustrated drawing manager module (IDM) for illustrated drawings to be inserted into manuals by using an illustrated drawing request (ID request) and mapping finished illustrated drawings to corresponding positions of corresponding paper technical manual and electronic technical manual; a TOC template (technical order contents template) for managing style information of a technical manual; a changer notice manager for notifying a change in the LSA DB to the technical manual associated with the change; an authoring manager for providing various authoring functions of the integrated authoring system for an electronic technical manual and a paper technical manual according to the present invention; and a print manager for printing information about the technical manual as a paper technical manual of standard specifications on the basis of a large volume of data. Here, the procedure of using the illustrated drawing request (ID request) performs two functions. The first is the function of requesting the illustrated drawing manager module for illustrated drawings to be included in technical manual, and the second is the function of mapping finished illustrated drawings to specific positions of the technical manual.

Hereinafter, an integrated authoring method for an electronic technical manual and a paper technical manual according to the present invention will be described.

The integrated authoring method for an electronic technical manual and a paper technical manual according to the present invention comprises: the manual author modeling step of constructing a manual contents database by extracting information to be included in the authoring of a technical manual from a logistics support analysis database of international standards, defining basic conditions for automatically extracting data to be included in the technical manual from the manual contents database by defining items, maintenance level, etc. associated with the classification of the technical manual while creating the technical manual, and then automatically creating a table of contents; the manual data conversion step of automatically extracting information to be included in the corresponding table of contents of the technical manual from the manual contents database on the basis of a search condition entered upon creating the technical manual and storing the extracted information in an international standard (MIL-PRF-87269) interactive electronic technical database higher than Class IV; the manual author-illustrated drawing manager module linkage processing step of automatically performing a user's request for illustrated drawings and an insertion task through a computer system in a network environment and identifying and managing each illustrated drawing without redundancy through identification codes generated from the chapter/section/paragraph information of the manual into which drawings are to be inserted; and the database conversion step of converting the MIL-PRF-87269 standard IETM database into a MIL-STD-2361 standard IETM database according to a user request in consideration of the fact that IETM DB-related international standards are not unified.

The integrated authoring method for an electronic technical manual and a paper technical manual according to the present invention will be described in detail with reference to FIGS. 2 to 11.

Figure 2:
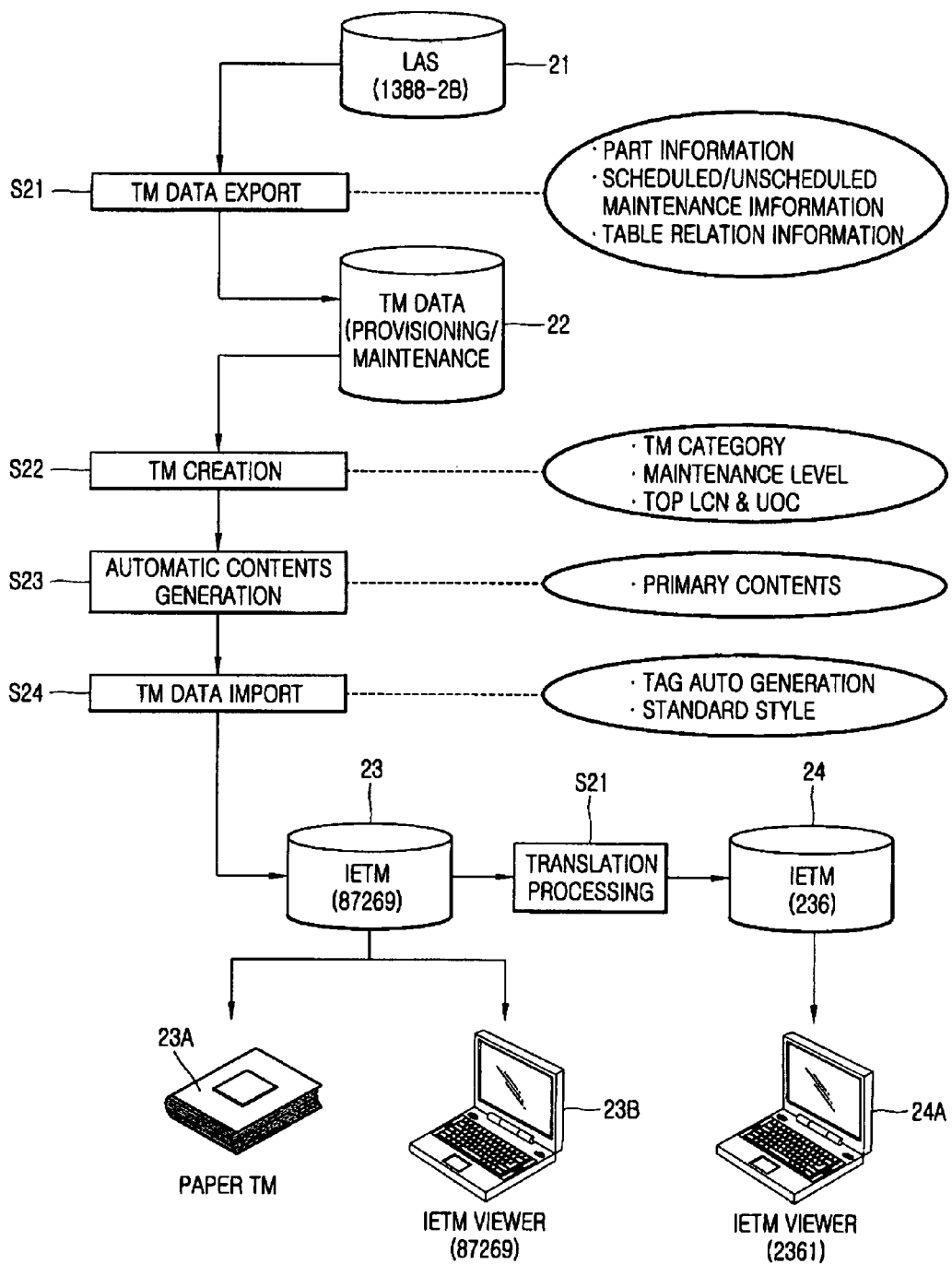
FIG. 2 is a work process explanatory diagram showing a manual authoring procedure of the integrated authoring system for an electronic technical manual and a paper technical manual according to the present invention.

FIG. 2 is a work process explanatory diagram showing a manual authoring procedure of the integrated authoring system for an electronic technical manual and a paper technical manual according to the present invention.

The above-described manual author modeling step is a procedure that newly defines the manual author process for minimizing a manual developer's workload, which is illustrated in FIG. 2.

Figure 3:
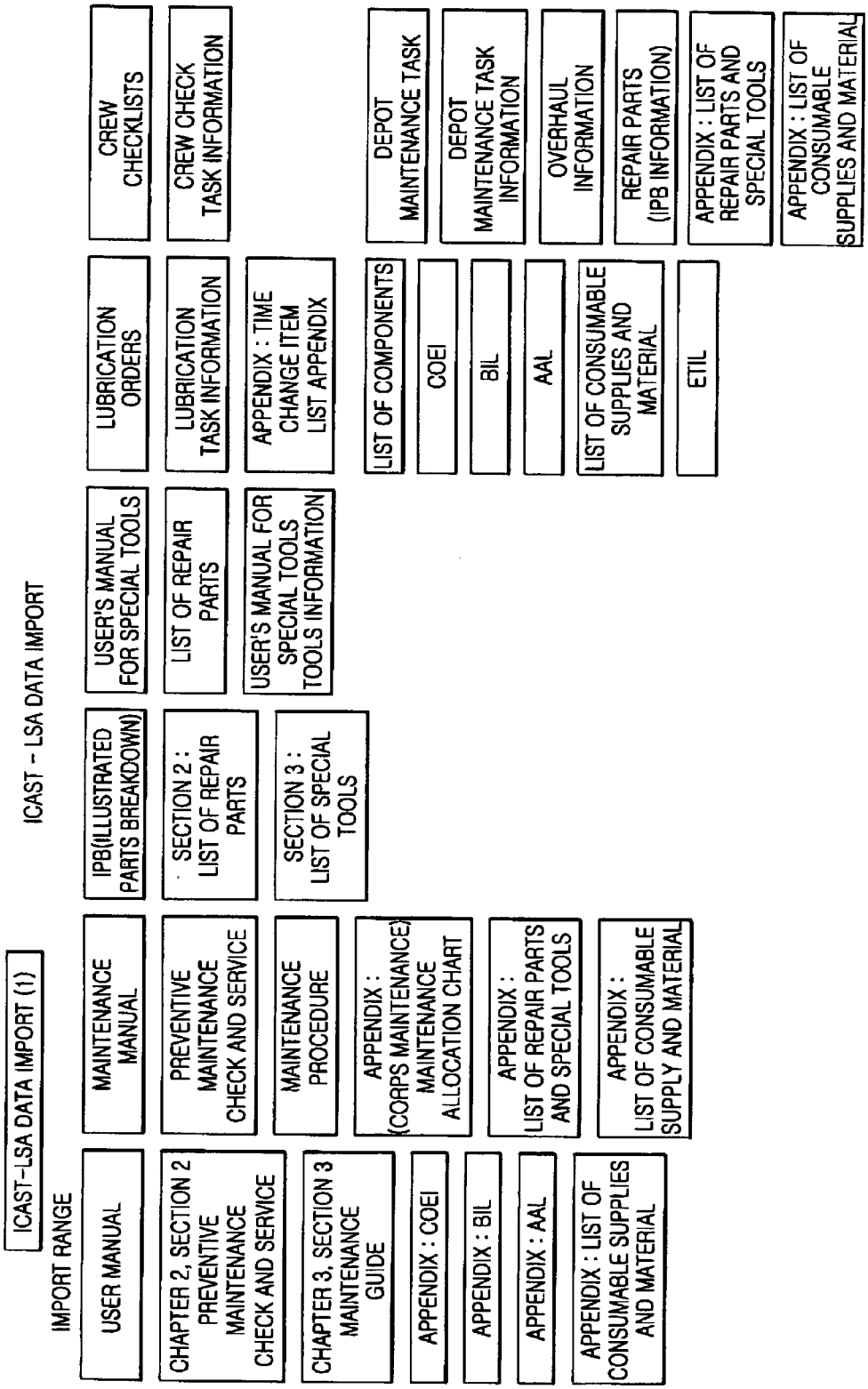
FIG. 3 is an exemplary view showing a LSA data import range for TM data construction according to the present invention.

In the TM data export step S21 of FIG. 2, a manual contents database 22 is constructed by extracting information to be included in the authoring of a technical manual from an international standard logistics support analysis database 21. That is, in the TM data export step S21, there is applied the new concept of extracting data to be included in a technical manual while a relational DB structure is maintained as it is. Thus, the automatic updated function and version management function are implemented, by which, in the case where the same data is commonly used in many technical manuals, all the technical manuals are modified and updated only by modifying the manual contents database 22. Moreover, since a new table structure suitable for technical manual information management is applied to the manual contents database 22 when the manual contents database 22 is constructed, the search/inquiry speed of data is improved. Here, as for the import range, as shown in FIG. 3, an enormous amount of data applied to every kind of technical manuals from a user manual to a window maintenance work request is all within the import range. Parts of a data extraction specification for the construction of the manual contents database 22 are illustrated in FIG. 4.

The technical manual TM creation step 22 of FIG. 2 is a step of defining basic conditions for automatically extracting data to be included in the technical manual from the manual contents database by defining items, maintenance level, etc. associated with the classification (e.g., into maintenance, supply, user, etc.) of the technical manual while creating the technical manual. By defining basic conditions as above, key information for automatically creating technical manual contents is newly added, thereby maintaining the information of the relation between the manual contents database 22 created from the LSA DB and the interactive electronic technical manual database (IETM DB) 23, an international standard DB of an electronic technical manual. Further, a test equipment operation guide manual can be automatically created by searching a list of special test equipment stored in the manual contents database 22.

FIG. 5a shows a structure of a manual registration screen, and FIG. 5b shows the concepts of manual creation and automatic registration of a test equipment operation guide. Here, the manual registration screen of FIG. 5a is a screen that registers a list of technical manuals to be preferentially developed in developing a technical manual because the number of kinds of technical manuals is varied according to weapon system. While other technical manuals except for a test equipment operation guide manual have to be entered in the DB directly by the user for registration, the test equipment operation guide manual is automatically registered from the manual contents DB. The step of automatic registration of a test equipment operation guide will now be described.

As shown in FIG. 5b, the user specifies UOC, LCN range, ALC, and maintenance level, and assigns first two positions of the above TMI. For example, the UOC is specified as AAA, the LCN range is specified as T to TZ, the ALC is specified as 00m the maintenance level is specified as user, corps, direct, general, and window, and first two positions of the TMI are specified as AT. Based on the specified EIAC, UOC, LCN range, and ALC, available LCN (LSA Control Number) and ALC (Alternate LSA Control Number) are extracted from a XF table, and all maintenance levels having the extracted LCN and ALC as maintenance tasks LCN and ALC are extracted from a task CA table. Based on the third position code of maintenance task codes, only the maintenance tasks conforming to the maintenance levels specified as an option by the user are extracted. For these extracted maintenance tasks, the CAGE and reference number of support equipment are extracted from a CG table. Using these extracted CAGE and reference number of support equipment, the value of an item classification code is extracted from a EA table. If the extracted value of an item classification code meets '7', 'M', 'D', or '1', a new technical manual is registered for target equipment. Afterwards, as the TMI of the new registered technical manual, first two positions plus a serial number (1~9 and A~Z) specified by the user are entered. Here, the XF table, CA table, EA table and CG table indicate table names of MIL-STD-13898-2B standard DB.

The automatic contents creation step S23 of FIG. 2 is a step of automatically creating a table of contents. Basically, a standard table of contents defined in the Department of Defense Specification for Technical manuals is automatically created, and the user can arbitrarily modify the created table of contents. Resultantly, this step is prepared to reduce the inconvenience of the user having to enter a table of contents one by one.

The aforementioned manual data conversion step is equivalent to the TM data import step S24 of FIG. 2. This step refers to a step of automatically extracting information to be included in the corresponding table of contents of each technical manual from the manual contents database 22 on the basis of the search conditions entered upon creating the technical manual and storing the extracted information in the international standard MIL-PRF-87269 interactive electronic technical manual database 23 higher than Class IV. That is, if the user specifies a chapter/section to import data from the manual contents database 22 from the created table of contents, maintenance tasks are automatically imported to the corresponding chapter/section and accordingly detail maintenance items of the created table of contents are automatically created. In case of a supply manual, the contents of the manual are all imported from the manual contents database 22, and there is no chapter/section that the user has to enter. A table of contents is also automatically created in a supply manual authoring procedure.

In the present invention, through the manual data conversion step, a paper manual can be printed according to the specification defined in the Defense Specifications for Technical Manuals, as well as an IETM can be viewed by the international standard MIL-PRF-87269 based interactive electronic technical manual database 23. For this, when designing the DTD (Data Type Description) of the international standard MIL-PRF-87269 based DB, the DTD is designed on the basis of the Department of Defense Specifications for Technical Manuals so as to be suitable for a paper manual printing service. The paper manual print function of the present invention is differentiated from the prior art IETM authoring system. The prior art IETM authoring system was developed just in view of a view service through a PC monitor and a user interface in a PC environment, thus it was impossible to print a paper manual of a complete specification.

Figure 6:
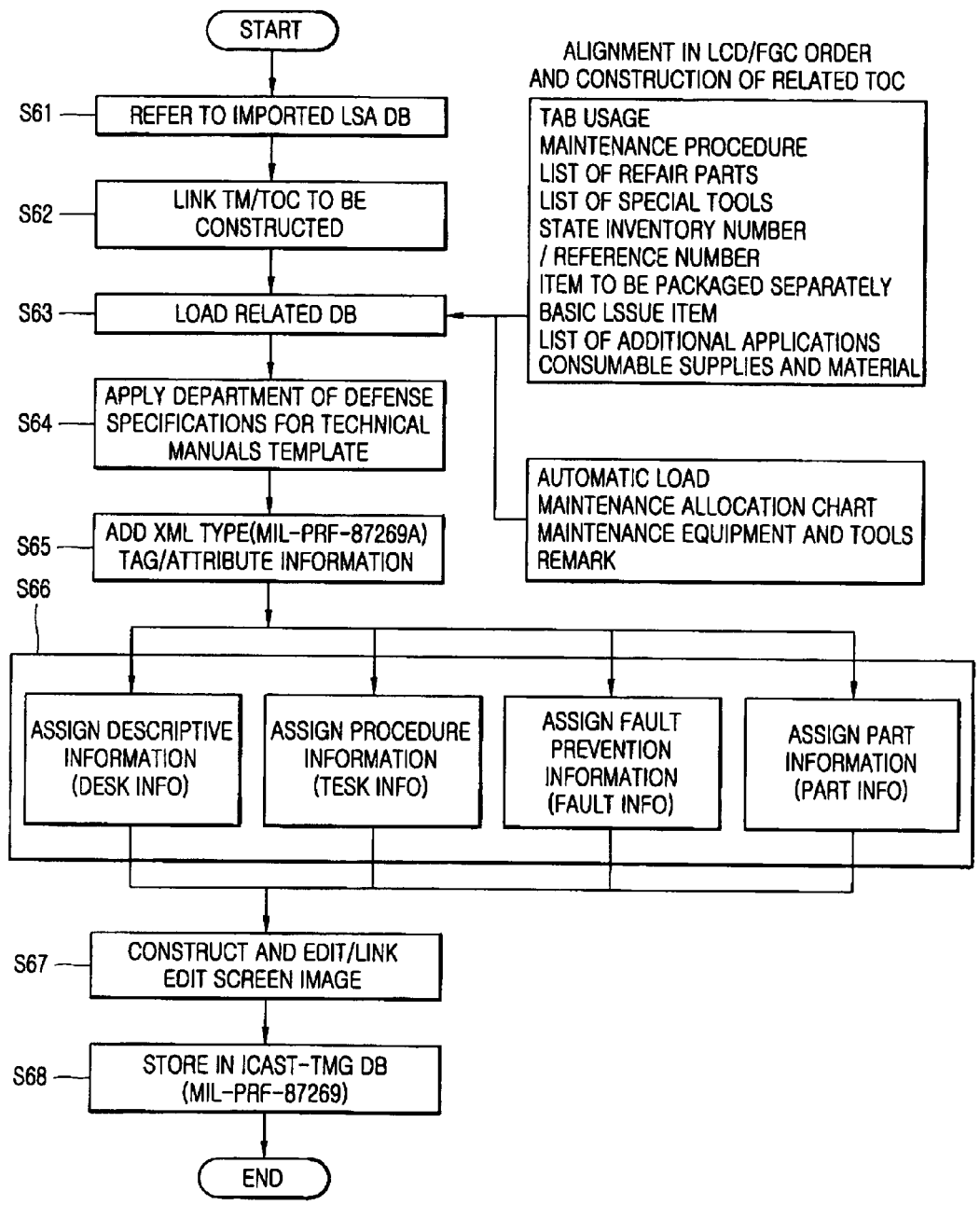
FIG. 6 is a flow chart showing the step of storing an international standard MIL-PRF-87269 based data according to the present invention.
Figure 7:
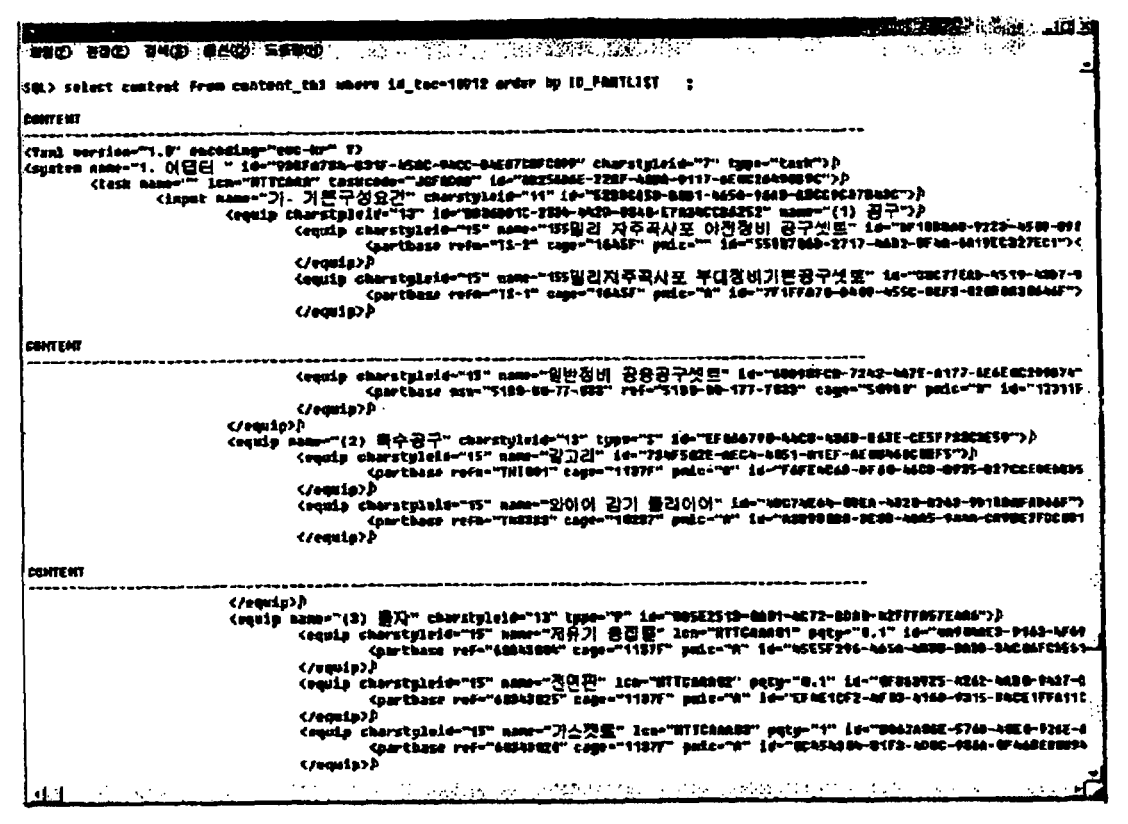
Figure 8:
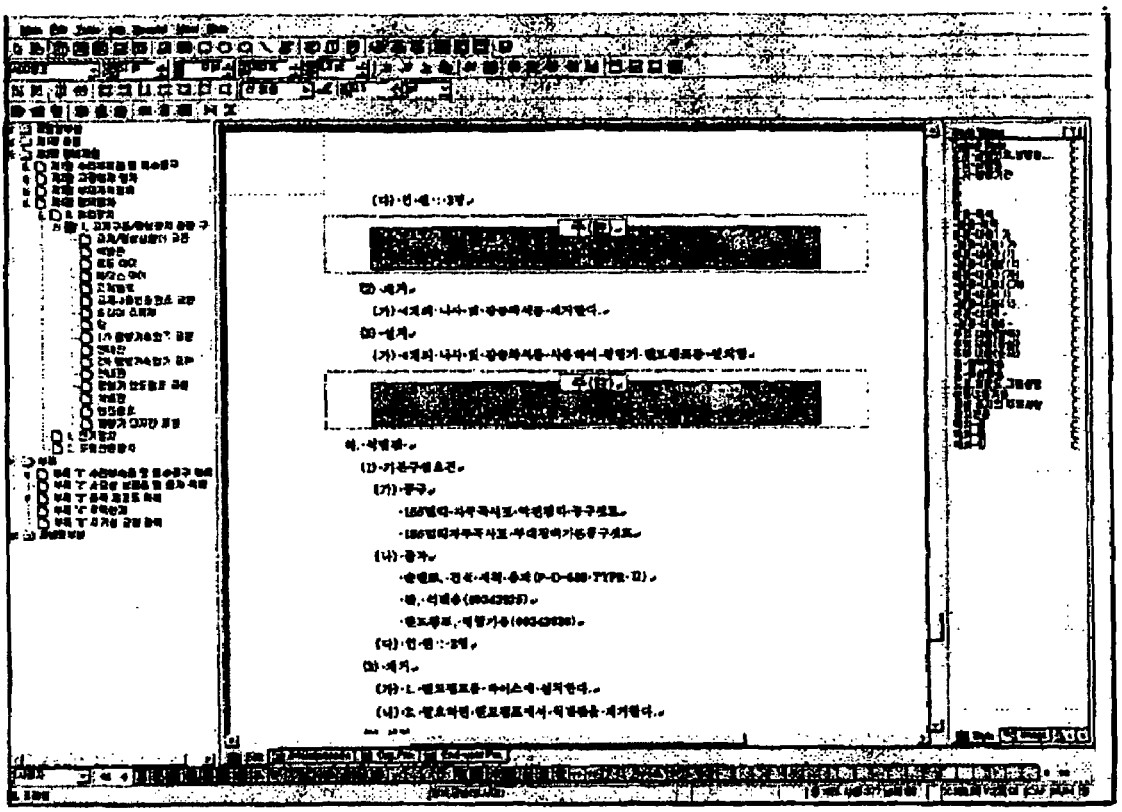
FIG. 8 is an exemplary view showing one example of a screen of the integrated authoring system for an electronic technical manual and a paper technical manual according to the present invention.

Here, a method of storing manual information extracted from the manual contents database 22 in the interactive electronic technical manual database 23 is shown in FIG. 6, one example of the result of inquiry of the stored data based on the international standard MIL-PRF-87269 is shown in FIG. 7, which shows one example where data based on the international standard MIL-PRF-87269 is displayed in the environment of the integrated technical manual authoring system according to the present invention. Here, the left frame of FIG. 8 shows a table of contents of a technical manual, the middle part of FIG. 8 shows a table of contents automatically created in the step of storing technical manual contents in the interactive electronic technical manual database 23, and the right part of FIG. 8 shows format information of the technical manual.

The step of storing the manual information extracted from the manual contents database 22 in the interactive electronic manual database 23 will be described with reference to FIG. 6.

As shown in FIG. 6, firstly, the imported manual contents database 22 is referenced, and TM/TOC (Tree of Contents) are constructed in linkage with each other. That is, the created technical manual and a list of related items to be included therein are constructed on the basis of LCN (LSA Control Number) and FGC (Functional Group Code) (S61, S62).

The related DB load step S63 is a step of extracting information corresponding to the created manual and table of contents from the manual contents database 22. This step is divided into the 'TAB use' step in which the user has to specify an upload option and the 'automatic load' step of extracting information as default without the user's option assignment or edition.

The manual information extracted through the related DB load step S63 is converted to the international standard MIL-PRF-87269 based IETM DB by applying page layout and format (e.g., interline space, indentation, etc.) information defined in the Department of Defense Specifications through the Department of Defense specifications for Technical Manuals template application step and adding 'XML type Tag/Attribute' information (e.g., title class, data object class, data format information (font, typeface, etc.)) of the MIL-PRF-87269A standard to the information (e.g., descriptive information, procedure information, fault prevention information, parts information) comprising each page (S64-S66). Thereafter, data of the manual contents database 22 is updated by performing modification/supplementation tasks including inquiring data from the manual contents database 22 through an authoring screen, inserting drawings to the inquired data or modifying the contents of the inquired data and storing them (S67, S68).

The manual author-illustrated drawing manager module linkage processing step is a processing step for inserting illustrated drawings into a technical manual through an illustrated drawing request.

Conventionally, a technical manual editor requested a technical illustrator for an illustration task offline. That is, the technical manual editor sent data including sketches, photos, drawings, etc. to the illustrator, received finished illustrated drawings from the illustrator, and then inserted them to proper positions of corresponding pages. However, in the present invention, such an illustration task request and an insertion task are automatically performed through a computer system in a network environment. This concept of illustrated drawing link will be described with reference to FIG. 9.

Figure 9:
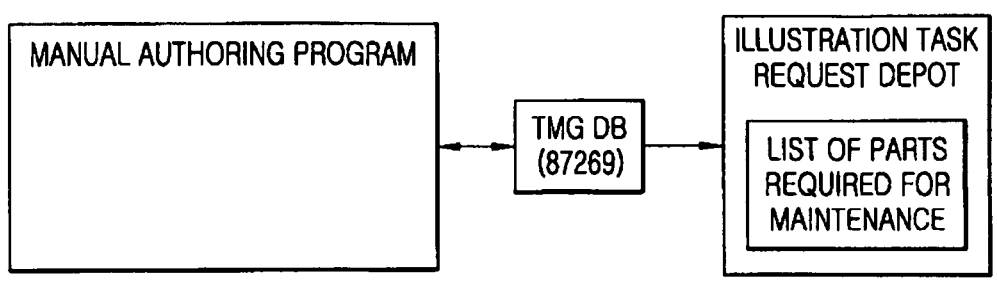
FIG. 9 is a conceptual view showing the concept of illustrated drawing link according to the present invention.
Figure 10:
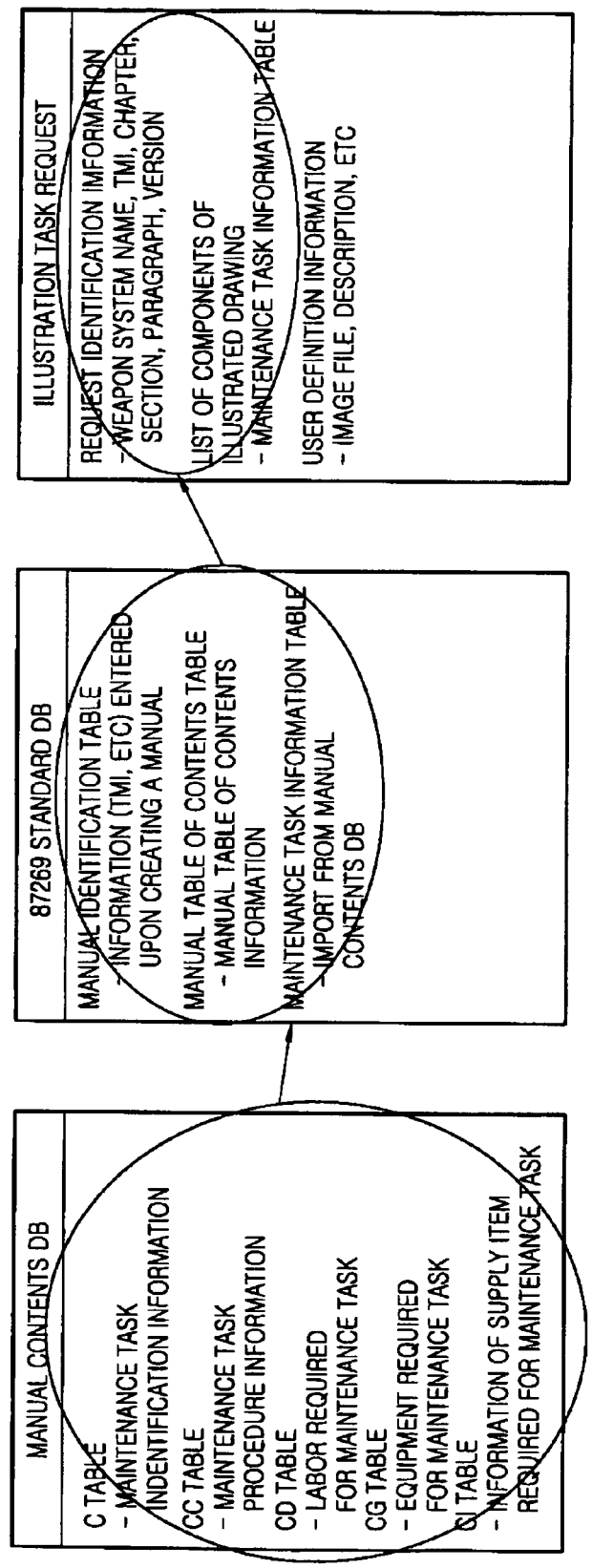
FIG. 10 is a conceptual view showing the concept of linking illustration task request creation and data.

When an author specifies a position into which a drawing is to be inserted in a manual authoring program, a square box of a corresponding color is displayed and an identification code of the drawing to be inserted is automatically allocated. This identification code consists of the structure of 'weapon system name—manual type—manual identification code (TMI)—table of contents (chapter•section•paragraph)/(LCN in case of supply manual)—Rev. number'. The identification code is automatically generated from the chapter•section•paragraph information of the manual into which the drawings are to be inserted. Therefore, in the present invention, each illustrated drawing can be identified and managed through the identification code without redundancy. When the user clicks on an illustration task request button after specifying a drawing insertion position, an illustration request window displayed on the right upper end of FIG. 9 is automatically generated. Here, the automatic generation of the window is done by using the fact that the information of the manual is managed in a DB structure. For example, in case of a maintenance task, identification information covering from the TMI (Technical Manual Identification) of an illustration task request window to Item Name can be automatically created by using task identification key combination (weapon system—weapon system model—manual identification code—maintenance task ICN—maintenance task code) information of the DB. A list of parts required for maintenance located at the center of the illustration task request window is also automatically created by extracting information of supply items required for a maintenance task stored in the DB. Such a link relation will be illustrated as in FIG. 10.

The manual data conversion step is a step of converting the international standard MIL-PRF-87269 based IETM database into the IETM database of the MIL-STD-2361 standard. The manual data conversion step is included to solve the problem that DB standards should be changed according to a user (user group) request because IETM DB-related international standards.

Figure 11:
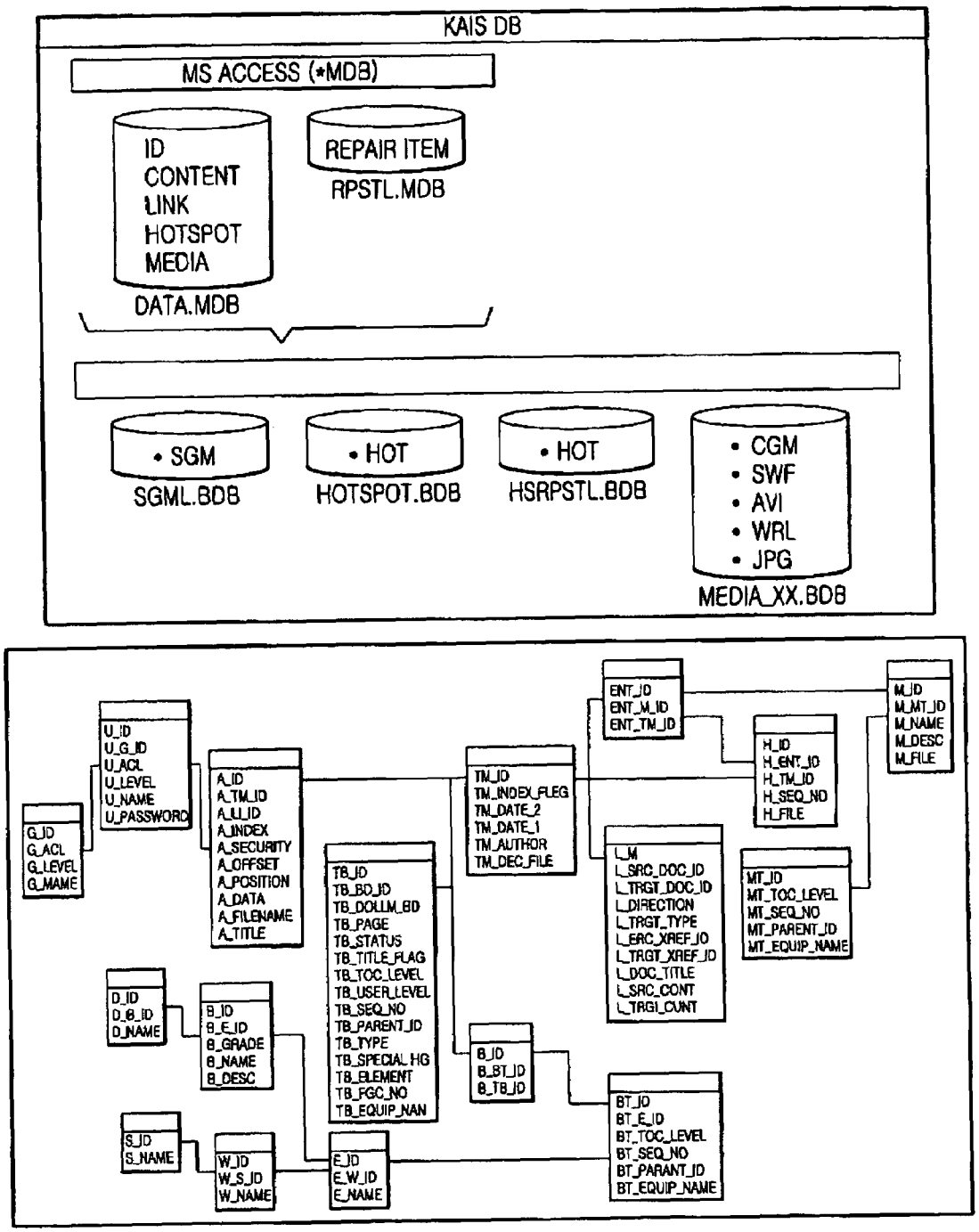
FIG. 11 is a conceptual view showing the conversion of a <MIL-STD-2361 standard> KAIS database according to the present invention.

The international standard MIL-PRF-87269 and the international standard MIL-PRF-2361 have several differences including the construction criteria (87269: system (electric system, hydraulic system, etc.) reference, 2361: Work Package (by chapter•section•paragraph of a table of contents of a manual) reference), a detail data type and so on). Hence, in the prior art authoring system, only one of the two standards was selected to manage manual data. However, the manual data conversion technique according to the present invention has solved the problem caused from the differences between the international standard MIL-PRF-87269 and the international standard MIL-PRF-2361 by developing a XML data parsing program. In a case where the international standard MIL-PRF-87269 based database is converted into KAIS (Korea Army IETM Standard), one of the international standard MIL-PRF-2361 based databases, the relation between DB information and a table are as shown in FIG. 11.

The manual data conversion step according to the present invention will be described below.

The international standard MIL-PRF-87269 based database stored in an Oracle DBMS can be largely divided into three, that is, text information, object files (illustrated drawings, sound, moving images, etc.), and DB link information of object files). Among them, the object files are not in a DB structure, but stored separately in a large capacity storage (for example, a hard disk) as a file system. In order to convert international standard MIL-PRF-87269 based data into international standard MIL-PRF-2361 based data, data in the international standard MIL-PRF-87269 based XML DB is read out and it is checked whether XML tag information have a defect or not. Then, international standard MIL-PRF-2361 based manual and table of contents are constructed by reading out each checked tag information. Next, technical manual information to be included in the table of contents are mapped from the international standard MIL-PRF_87269 based DB to the international standard MIL-PRF-2361 based DB, respectively. A DB conversion program according to the present invention is a program having the function of reading out international standard MIL-PRF-87269 based XML data and checking whether there is a defect or not, the function of generating an international standard MIL-PRF-2361 based manual structure, and the function of mapping between the international standard MIL-PRF-87269 based DB and the international standard MIL-PRF-2361 based DB.

An operation procedure of a manual data conversion program according to the present invention will be described by way of example of KAIS DB indicated in FIG. 11.

Firstly, XML data is read from Oracle, and this data is read out through tag information of the XML. In the readout step, it is checked whether there is a defect in the tag information or not. Based on the result of the readout, if the data is judged to be structural information (account, table of contents, link, hot spot, etc.) of a manual, the data is stored in the DATA.MDB DB file of a MS access DB. As a result of the readout, if the data is judged to correspond to the contents of the body of the manual, the data is stored in the corresponding Berkeley DB file (SGML.BDB, HOTSPOT, BDB. etc.) according to the type of the data. Through this procedure, an international standard MIL-PRF-2361 based IETM DB is newly created. Since this creation is processed in batch for every data, the user can create a DB serviceable through the international standard MIL-PRF-2361 based IETM viewing system only by clicking on a program execution button.

As described above in detail, the integrated authoring system for an electronic technical manual and a paper technical manual and the authoring method therefore according to the present invention can reduce the development period and budget for a technical manual and increase the logistics support characteristics of a weapon system by the development of a technical manual based on logistics support data by providing an integrated authoring system that automatically converts data extracted from an international standard logistics support analysis database into an interactive electronic technical manual (IETM) of Class IV level and an international standard (MIL-PRF-87269, MIL-STD-2361) database.

Moreover, the integrated authoring system for an electronic technical manual and a paper technical manual and the authoring method therefore according to the present invention can reduce a manual development period and the examination/test evaluation period for development data of the government and army by avoiding redundant entry of the same data, having the automatic entry function of the knowledge based expert system concept and assuring data integrity, resultantly reducing the development cost.

Besides, the integrated authoring system for an electronic technical manual and a paper technical manual and the authoring method therefore according to the present invention can improve the level of a technical manual development technique and have a spillover effect on the fields of internet solution development and IETM development technologies regarding program implementation by avoiding redundant entry by utilizing LSA data in the development of a technical manual.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An integrated authoring method for an electronic technical manual and a paper technical manual comprises comprising:

the manual author modeling step of constructing a manual contents database by extracting information to be included in the authoring of a technical manual from MIL-STD-1388-2B standard of a logistics support analysis database (LSA DB), defining basic conditions for extracting data to be included in the technical manual from the manual contents database by defining technical manual category, related items, maintenance level, LCN (Logistics support analysis Control Number) and FGC (Functional Group Code) information associated with the classification of the technical manual while creating the technical manual, and then creating a table of contents for the technical manual;

the manual data conversion step of extracting information to be included in the table of contents of the technical manual from the manual contents database on the basis of the basic conditions and storing the extracted information in MIL-PRF-87269 standard of interactive electronic technical manual database; and the manual author-illustrated drawing manager module linkage processing step of automatically performing a user's request for illustrated drawings and an insertion task through a computer system in a network environment and identifying and managing each illustrated drawing without redundancy through identification codes generated from the chapter-section-paragraph information of the manual into which drawings are to be inserted, wherein the manual data conversion step, when the extracted information is stored in the interactive electronic technical manual database, further comprises:

the step of constructing the created technical manual and a list of related items to be included therein are constructed on the basis of LCN (Logistics support analysis Control Number) and FGC (Functional Group Code);

the step of extracting information corresponding to the created technical manual and table of contents from the manual contents database;

the step of converting the extracted information to the MIL-PRF-87269 standard of interactive electronic technical manual database (IETM DB) by applying page layout and format information defined in the Department of Defense Specifications through the Department of Defense specifications for Paper Technical Manuals template application and adding Extensible Markup Language (XML) type Tag/Attribute information of the MIL-PRF-87269 standard to the information comprising each page; and the step of performing modification/supplementation tasks including inquiring data from the manual contents database, and inserting drawings to the inquired data or modifying the contents; and wherein the manual author-illustrated drawing manager module linkage processing step comprises:

the step of displaying a square box of a corresponding color and automatically allocating an identification code of the drawing to be inserted when a position into which a drawing is to be inserted is specified in a manual authoring program;

the step of automatically generating the identification code from the chapter-section-paragraph information of the manual into which the drawings are to be inserted; and the step of automatically generating an illustration request window when an illustration task request button is clicked on after specifying a drawing insertion position; and wherein the identification code consists of the structure of weapon system name—manual type—manual identification code (Technical Manual Identification (TMI))—table of contents (chapter-section-paragraph)/(LSA Control Number (LCN) -in case of supply manual)—Rev, number.

2. The method of claim 1, wherein the manual author modeling step comprises the step of extracting manual data while a relational database (DB) structure is maintained as its when extracting information to be included in the authoring of a manual.

3. The method of claim 1, wherein the manual author modeling step comprises the step of applying a new table structure suitable for manual information management when constructing the manual contents database to thereby improve the search/inquiry speed of data and search data faster than logistics support analysis database (LSA DB) environment.

4. The method of claim 1, wherein in the manual author modeling step, the information of the relation is maintained between the manual contents database created from the logistics support analysis database (LSA DB) and the interactive electronic technical manual database (IETM DB).

5. The method of claim 1, wherein in the manual author modeling step, when the table of contents is created, a standard table of contents defined in the Department of Defense Specification for Technical manuals is created, and the created table of contents can be arbitrarily modified.

6. The method of claim 1, wherein in the manual data conversion step, if the user specifies a chapter/section in the created table of contents to import data from the manual contents database from the created table of contents, maintenance tasks are automatically imported to the corresponding chapter/section and accordingly detail maintenance items of the created table of contents are automatically created in the table of contents, wherein if the technical manual is a supply manual, the contents of the manual are all imported from the manual contents database without the user's input.

7. The method of claim 1, further comprising a database conversion step, which comprises:

the step of reading out data in the MIL-PRF-87269 standard based extensible markup language database (XML DB) and checking if extensible markup language (XML) tag information have a defect;

the step of constructing MIL-PRF-2361 standard based manual and table of contents by reading out each checked tag information; and the step of mapping technical manual information to be included in the table of contents from the MIL-PRF-87269 standard based database (DB) to the MIL-PRF-2361 standard based database (DB).

\* \* \* \* \*